(12) United States Patent
Zeibak et al.

(10) Patent No.: US 12,048,272 B2
(45) Date of Patent: Jul. 30, 2024

(54) AGRICULTURAL TRELLIS SYSTEMS, AND ASSOCIATED DEVICES AND METHODS

(71) Applicant: Wilson OVS Acquisition Corp., Yakima, WA (US)

(72) Inventors: Zachary R. Zeibak, Yakima, WA (US); Steven W. Kuhn, Yakima, WA (US); Corey R. Coad, McMinnville, OR (US); Nicholas M. Arnold, Silverton, OR (US); Christian E. Siems, Paso Robles, CA (US)

(73) Assignee: Wilson OVS Acquisition Corp., Yakima, WA (US)

( * ) Notice: Subject to any disclaimer, the term of this patent is extended or adjusted under 35 U.S.C. 154(b) by 0 days.

(21) Appl. No.: 17/882,431

(22) Filed: Aug. 5, 2022

(65) Prior Publication Data

US 2023/0039568 A1    Feb. 9, 2023

Related U.S. Application Data

(60) Provisional application No. 63/230,586, filed on Aug. 6, 2021.

(51) Int. Cl.
*A01G 17/06* (2006.01)
(52) U.S. Cl.
CPC .................................. *A01G 17/06* (2013.01)
(58) Field of Classification Search
CPC .... A01G 17/06; A01G 9/12; A01G 2017/065; A01G 3/0408
See application file for complete search history.

(56) References Cited

U.S. PATENT DOCUMENTS

| 1,028,630 | A | * | 6/1912 | Stryker | .............. A62B 35/0056 |
| 5,966,867 | A | * | 10/1999 | Downer | ................. A01G 17/04 47/46 |

(Continued)

FOREIGN PATENT DOCUMENTS

| WO | 2006/126193 A1 | 11/2006 |
| WO | 2006126193 A1 | 11/2006 |

OTHER PUBLICATIONS

International Search Report and Written Opinion mailed Nov. 23, 2022, issued in corresponding International Application No. PCT/US2022/039626, filed Aug. 2, 2022, 6 pages.

(Continued)

*Primary Examiner* — Joshua J Michener
*Assistant Examiner* — Henry Hooper Mudd
(74) *Attorney, Agent, or Firm* — Christensen O'Connor Johnson Kindness PLLC

(57) ABSTRACT

An agricultural trellis system is provided and generally includes a notch configured to receive a trellis wire therein and selectively release the trellis wire upward during mechanical pruning. The notch can be positioned on an above-ground portion of a vertical line post or a cross arm. The notch can include a tab extending upward from the bottom of the notch, and a first edge and a second edge each formed on the body. The first edge can be a flat edge and can be positioned laterally outwardly from at least a portion of the second edge, which can be a curved edge. The notch can include a retention protrusion extending laterally into the notch toward the second edge to a position where a lateral distance between the retention protrusion and the first edge in a direction normal to the central plane is less than a diameter of the trellis wire.

30 Claims, 10 Drawing Sheets

(56) References Cited

U.S. PATENT DOCUMENTS

| 6,138,407 | A | | 10/2000 | Pierce, Jr. | |
|---|---|---|---|---|---|
| D438,648 | S | * | 3/2001 | Coulson | D25/132 |
| 6,454,244 | B1 | | 9/2002 | Coulson | |
| 10,085,389 | B1 | * | 10/2018 | Banaszek | A01G 9/12 |
| 2006/0059774 | A1 | | 3/2006 | Pierce, Jr. | |
| 2013/0000187 | A1 | * | 1/2013 | Raisacher | A01G 17/14 47/46 |
| 2013/0212860 | A1 | | 8/2013 | Schaeffer | |
| 2016/0003409 | A1 | * | 1/2016 | Johns | F16M 13/02 |
| 2022/0192108 | A1 | * | 6/2022 | Barnes | A01G 17/06 |

OTHER PUBLICATIONS

International Searching Authority, International Search Report and Written Opinion, PCT Patent Application PCT/US2022/039626, mailed Nov. 23, 2022, 8 pages.

* cited by examiner

AGRICULTURAL TRELLIS SYSTEMS, AND ASSOCIATED DEVICES AND METHODS

CROSS-REFERENCE TO RELATED APPLICATION(S)

The present application claims priority to U.S. Provisional Patent Application No. 63/230,586, entitled AGRICULTURAL TRELLIS SYSTEMS, AND ASSOCIATED DEVICES AND METHODS, filed Aug. 6, 2021, the disclosure of which is incorporated herein by reference in its entirety.

TECHNICAL FIELD

The present disclosure is generally directed to agricultural trellis systems for fruit-bearing trees and vines, including agricultural trellis systems having load bearing vertical line posts with trellis wire notches compatible with mechanical pruning devices, and associated devices and methods.

BACKGROUND

Trellis systems are used to increase production in fruit- and nut-bearing tree and vine crops by diverting a portion of the allocation of biomass production from structural development into fruit production and growth. Free-standing fruit trees and vines devote a large portion of their biomass production to establishing the structural scaffold required to support the weight of a fruit crop, especially during the years of growth following planting. Trellis structures generally include a series of support members with horizontal wires extending along the row of the crop. The tree or vine is tied or clipped to the wires, allowing the crop to develop a less robust trunk and branch structure scaffold. Fruit- and nut-bearing trees and vines grown with a trellis system typically experience increased precocity, producing their first commercial crops earlier than non-trellised crops, and have a higher crop yield per acre over the life of the vineyard or orchard.

As the manual labor traditionally used to perform a wide range of horticultural tasks in commercial vineyards and orchards becomes scarcer and more expensive, some of those tasks can be mechanized, such as the tasks of pruning trees and vines and harvesting crops. The use of mechanical pruning devices, particularly for pruning wine grapes, can provide a substantial benefit to vineyards and orchards, but wide scale adoption has been limited by the lack of trellis systems that (a) are compatible with mechanical pruning devices, (b) have acceptable durability, and/or (c) provide the necessary horticultural functionality. Many conventional technology trellis posts claim compatibility with mechanical pruning devices, but include mechanisms or receptacles (e.g., plastic clips, hooks, etc.) external to the profile of the portion securing the trellis wires which have significant limitations. Systems with plastic clips can fail when struck by equipment during regular farming operations such as mechanical harvesting, creating a significant maintenance and labor cost, and external metal hooks can bend and/or deform, e.g., when repeatedly bending the base of the hook weakens the metal, causing the hook to fail.

Conventional mechanical-pruner-compatible trellis systems require secondary (post-production line) operations that add significant cost to the finished goods, e.g., due to plastic clips that must be assembled into the posts, and/or hooks that require secondary machining operations. To balance and account for increased costs of post-production operations, conventional trellis systems typically use a thinner gauge metal, which reduces the strength compared to standard line posts. The thinner metal is galvanized to optimize the durability of such a thin-walled product. In the wine grape industry, where vineyards serve both a productive and aesthetic function, many vineyard managers find galvanized posts too visible and aesthetically industrial, and instead prefer material that oxidizes to create a natural, traditional weathered look.

DETAILED DESCRIPTION

Figure 1A:
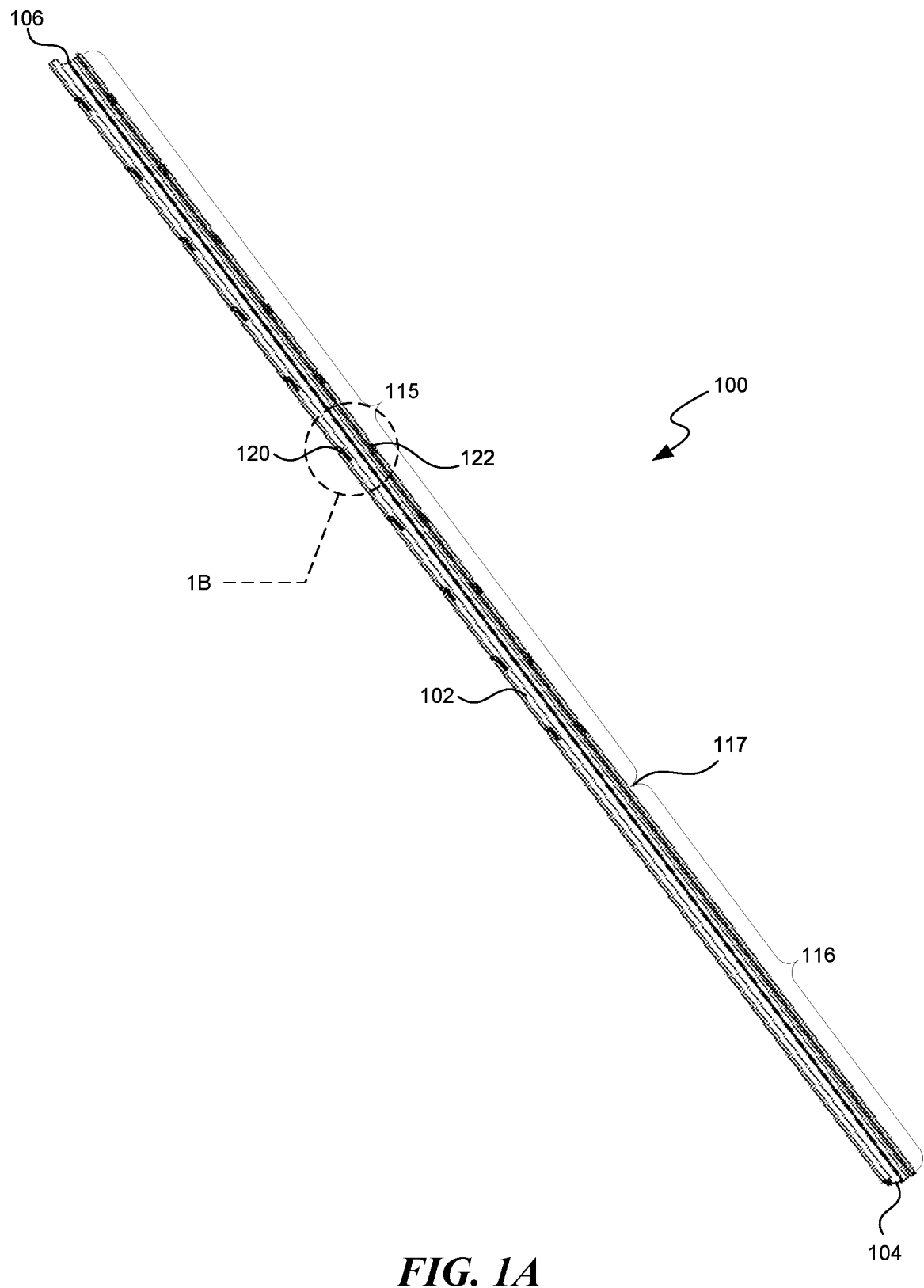
FIG. 1A is a perspective view of a representative trellis vertical line post configured in accordance with embodiments of the present technology.

The following disclosure describes various embodiments of agricultural trellis systems having wire retention notches that are compatible for use with mechanical pruning devices. Trellis systems of the present technology described herein are capable of securing trellis wires within notches for growing purposes, while preventing the trellis wires from escaping from the notches until removed by a mechanical pruning device. In some embodiments, the trellis system includes a notched vertical/vineyard line post ("VLP") having inwardly extending notches within the outer profile of the VLP. In other embodiments, the trellis system includes cross-arms having notches, where the cross-arms are configured to attach to a conventional line post using any suitable attachment (e.g., fasteners, clamps, etc.). In embodiments having a notched VLP, the notches can be cut from the post material prior to forming the posts or can be cut after forming the posts, and thus eliminate the need for the secondary operations required during conventional manufacturing processes, including installing plastic clips and/or forming external hooks. In this regard, embodiments of the present technology can provide a manufacturing advantage that allows the use of thicker gauge and/or higher quality materials without an overall part cost increase when compared to other trellis technology on the market.

The notches of the trellis systems of the present technology are configured secure the trellis wire within the notch, without allowing the wire to escape the notch in response to upward forces based on tension on the wire. For example, when the line post is positioned at a low point of vineyard/ orchard topography compared to other line posts, the tensioned wire exerts a "lifting" force on the low line post. With conventional technology wire trellis systems, the wire is prevented from inadvertently escaping from a wire notch by having an upward locking channel (e.g., a notch with an opening facing downward that retains the wire as it is lifted); however, such conventional notches are not compatible with mechanical pruning devices as the pruning device must lift the wire out of the notch and away from the VLP. In this regard, the notches of the present technology are configured to release the trellis wire during mechanical pruning. Mechanical pruning devices, such as the KLIMA® pruning machine manufactured and sold by KLIMA®, 30 Maxwell Road, Blenheim, Marlborough, New Zealand, lift the trellis wires up and away from the trellis row and line post, while the cutting and grinding blades remove unwanted growth from the vines or trees. After the pruning operation, the wires are re-attached to the posts manually. If the feature (hook, notch, clip, etc.) of the trellis system securing wires fails to release the wires, the mechanical pruning device will pull the trellis posts out of the ground and/or impact the trellis posts. Embodiments of the present technology are expected to prevent this outcome.

Figure 2:
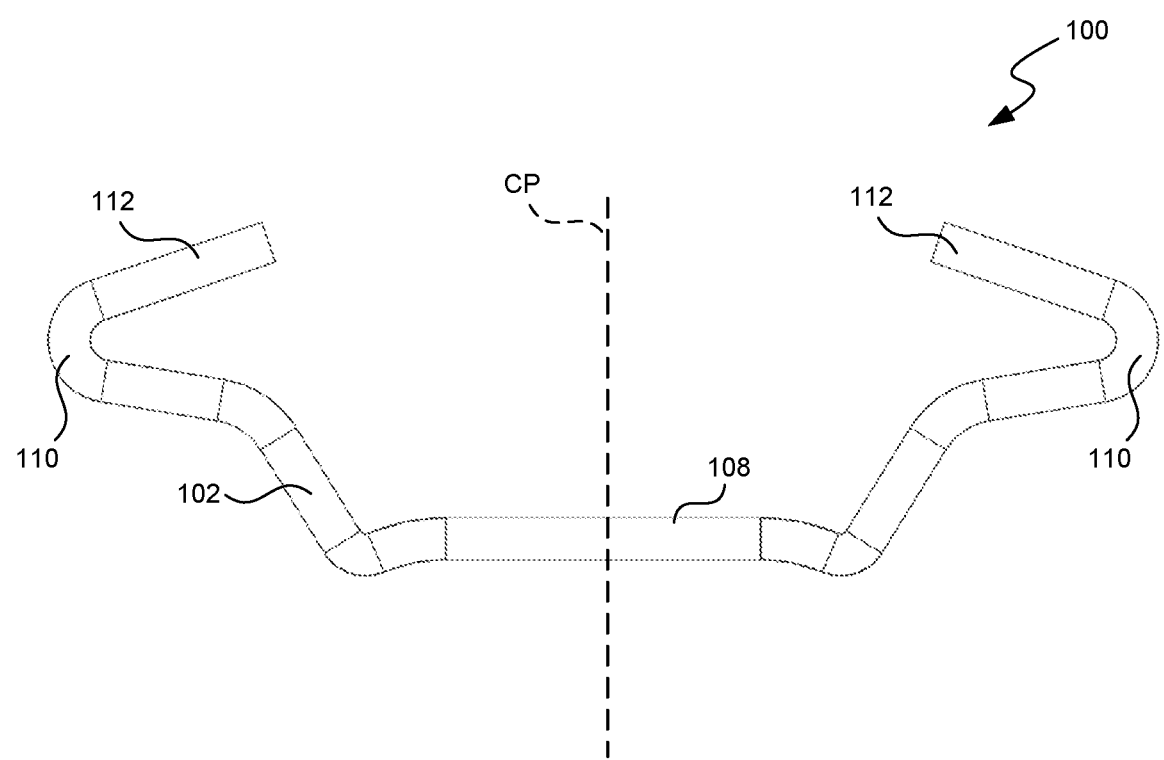
FIG. 2 is a top view of the trellis vertical line post shown in FIG. 1A.

Embodiments of the trellis system with a notched VLP can have a profile formed by roll forming, brake pressing, and/or stamping a metallic plate or strip, thus forming the shapes shown in the Figures (see, e.g., FIG. 2). The notches can be machined, punched, and/or otherwise suitably formed in the flat plate or strip prior to roll forming, brake pressing, or stamping the profile of the post; or the notches can be machined, punched, or otherwise formed after forming the steel to the finished profile; or the notches can be formed via any combination thereof (e.g., full/partial pre-punching and post-machining, etc.). In other embodiments, the VLP can be formed by an extrusion manufacturing process. After forming, the notches generally include an upwardly projecting tab configured to retain the wire within the notch, and have a shape that resists or prevents the wire from escaping, even if it is subjected to upward forces as a result of being tensioned. As will be described in greater detail below, the wire must bend or deflect to pass a laterally offset retention protrusion of the tab, so as to be retained in the bottom of the notch during growth phase use of the trellis system (see, e.g., FIGS. 4A-4D). Accordingly, the wire can be bent or deflected for insertion and removal from the notch by an angle from about 5° to 20°, about 5° to 15°, or about 7° to 13° with respect to the direction of the row of the vineyard or orchard. Once the trellis wire is under standard growing phase tension, the wire does not experience enough upward force to deflect the wire and cause it to escape the notch (e.g., in low areas of the vineyard or orchard topography where an upward force is exerted on the wire in the notches); however, the higher upward force provided by a mechanical pruning device overcomes the tension in the wire to deflect the wire at the required angles and escape the notch.

Certain details of the present technology are set forth in the following description and in FIGS. 1-6B to provide a thorough understanding of various embodiments of the present technology. In other instances, well-known structures, systems, materials and/or operations often associated with agricultural trellis structures are not shown or described in detail in the following disclosure to avoid unnecessarily obscuring the description of the various embodiments of the technology. Those of ordinary skill in the art will recognize, however, that the present technology can be practiced without one or more of the details set forth herein, or with other structures, methods, components, and so forth. The terminology used below is to be interpreted in its broadest reasonable manner, even though it is being used in conjunction with a detailed description of certain examples of embodiments of the technology. Indeed, certain terms may even be emphasized below; however, any terminology intended to be interpreted in any restricted manner will be overtly and specifically defined as such in this Detailed Description section.

The accompanying Figures depict embodiments of the present technology, and unless expressly indicated (e.g., in the claims), are not intended to be limiting of its scope. The various depicted elements are not necessarily drawn to scale, and these various elements may be arbitrarily enlarged to improve legibility. Component details may be abstracted in the Figures to exclude details such as position of components and certain precise connections between such components when such details are unnecessary for a complete understanding of how to make and use systems in accordance with the technology. Additionally, many of the details, dimensions, angles, and/or other features shown in the Figures are merely illustrative of particular embodiments of the technology. Accordingly, other embodiments can have other details, dimensions, angles and features without departing from the present technology. Those of ordinary skill in the art will also appreciate that further embodiments of the technology can be practiced without several of the details described below. In the Figures, identical reference numbers identify identical, or at least generally similar, elements.

Vertical Line Post Embodiment

FIG. 1A is a perspective view of a trellis vertical line post 100 ("post 100") configured in accordance with embodiments of the present technology. The post 100 is configured to be the primary load-bearing member of a vertical shoot positioning trellis system ("VSP system"). A VSP system generally includes anchor posts at each end having a tiedown cable or wire looped around the end anchor post and through the eyelet of an earth anchor (not shown). Wires extend between the two anchor posts, which are placed under tension and secured, and the posts 100 are positioned at intermediate locations along the length of trellis wire to carry the trellis wires and bear the weight of the vines or trees as they grow. The VSP system can also include training stakes for training the growth of the vines or trees. The VSP system generally includes wires or lateral wire pairs, separated vertically. The wires can be used for drip irrigation, cordon/fruiting wires, crop loadbearing, movable catch wires, and/or other functions The post 100 includes an elongate body 102 having a bottom end (or end portion) 104 and a top end (or end portion) 106. In some embodiments, the body 102 includes a plurality of notch pairs positioned along at least an above-ground upper portion 115 extending from an intermediate area 117 along the length of the body 102 to the top end 106, with each notch pair having a first notch 120 and a second notch 122 positioned laterally away from each other and generally opening toward the top end 106. The body 102 can also have a subterranean portion 116 extending from the bottom end 104 to the intermediate area 117, where the subterranean portion 116 is configured to be driven into the ground to support the weight of the wires of the trellis system and crops, and to provide stability in the three rotational degrees of freedom (e.g., twisting about an axis along the body 102, bending along a trellis row, and/or bending lateral to the trellis row). In some embodiments, the post 100 is between about 6 feet and 10 feet in length. In one example, the post 100 has: (A) 8 feet of length; (B) between 8 and 10 pairs of first and second notches 120 and 122, with the highest notch pair about 1 to 3 inches from the top end 106; (C) about 6 inches spacing along the length of the upper portion 115 between each of the pairs of the first and second notches 120 and 122; and (D) between 2 and 3 feet of length of the subterranean portion 116. In other embodiments, the post 100 can be any suitable length, include any number of pairs of first and second notches 120 and 122 configured to support the trellis wires necessary for growth of the crop, including any spacing of the first and second notches 120 and 122, and have a subterranean portion 116 of any portion of the length of the post 100.

Figure 1B:
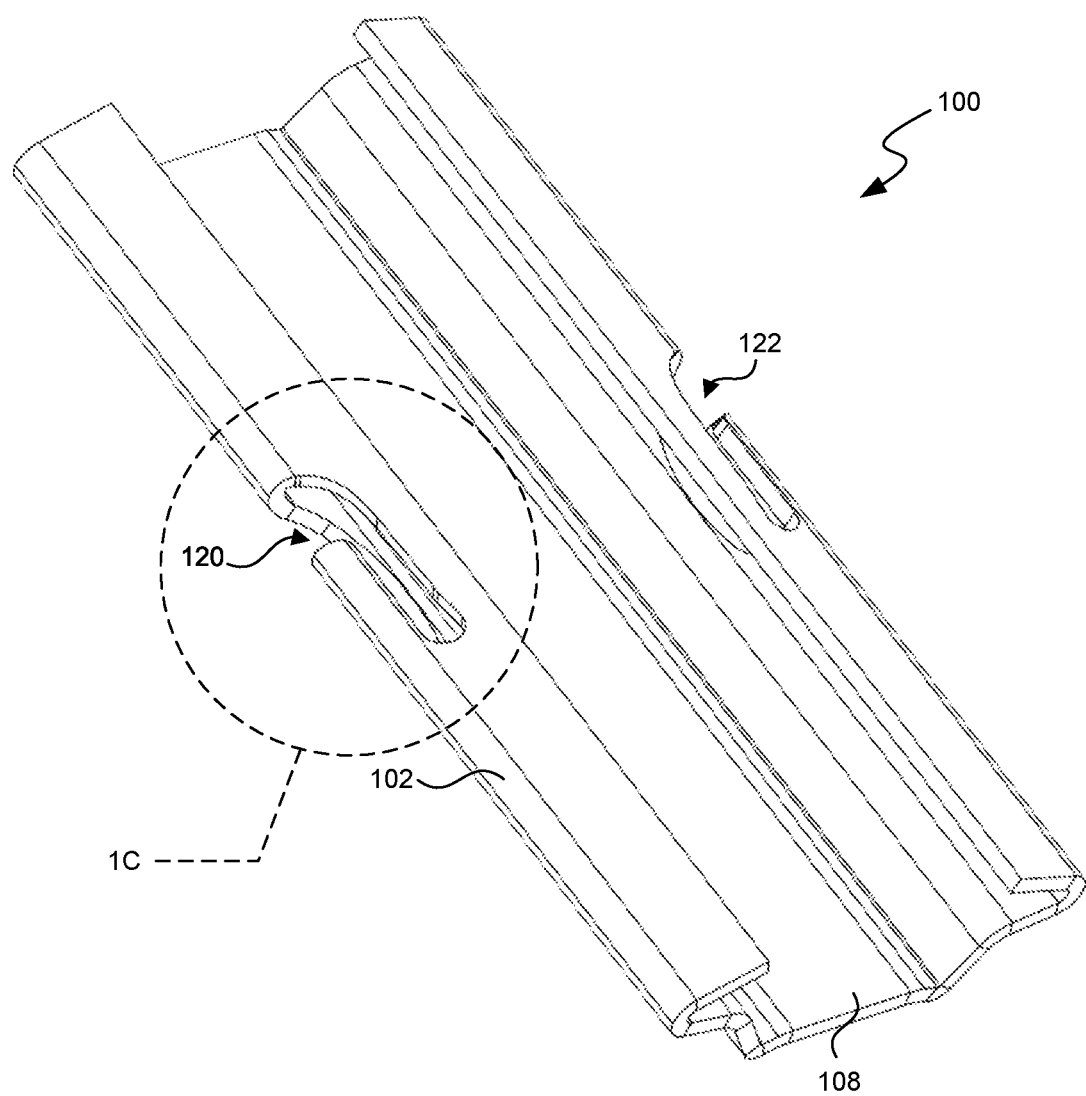
FIGS. 1B and 1C are detailed perspective views of a portion of the trellis vertical line post of FIG. 1A showing trellis wire notches.
Figure 1C:
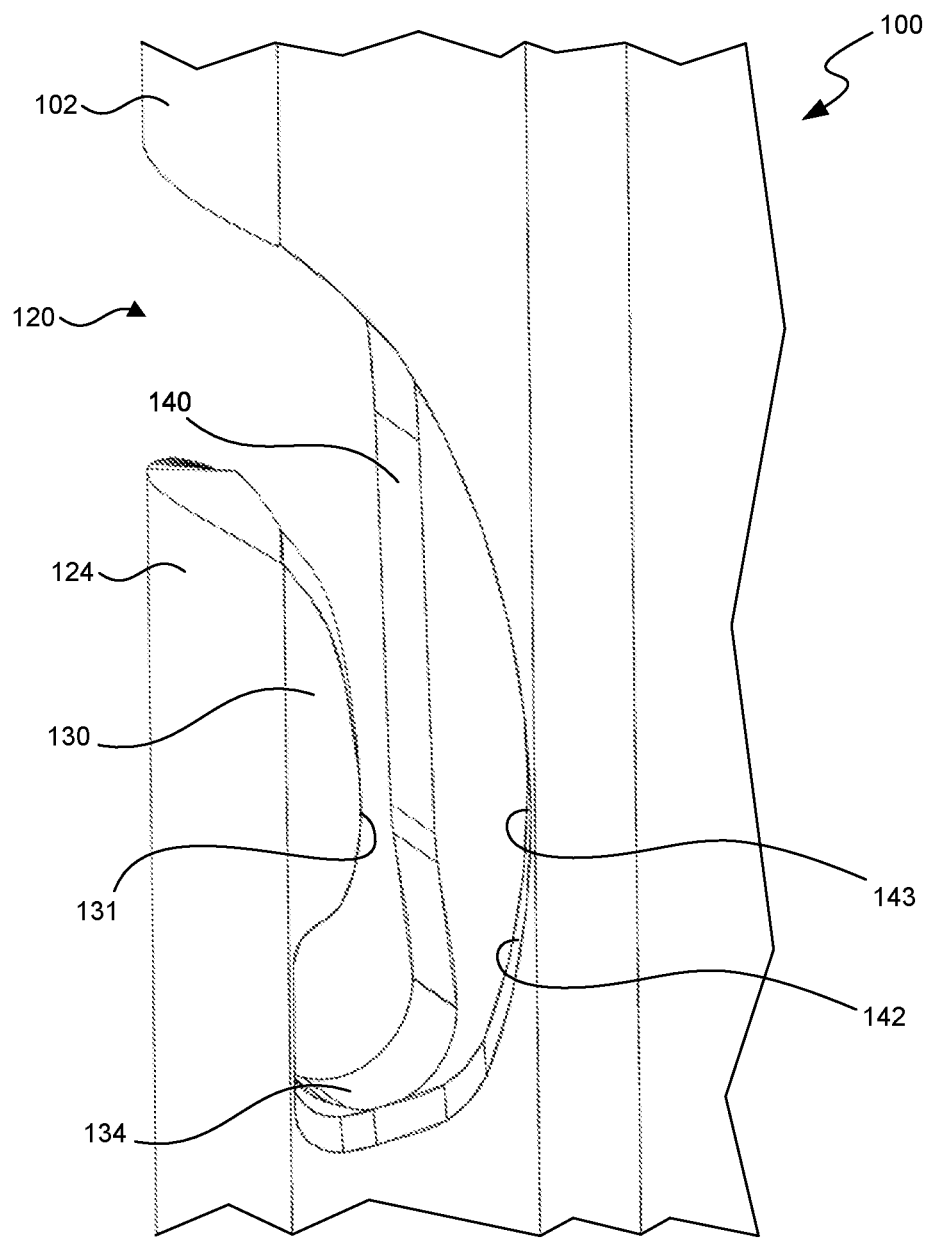
Figure 3:
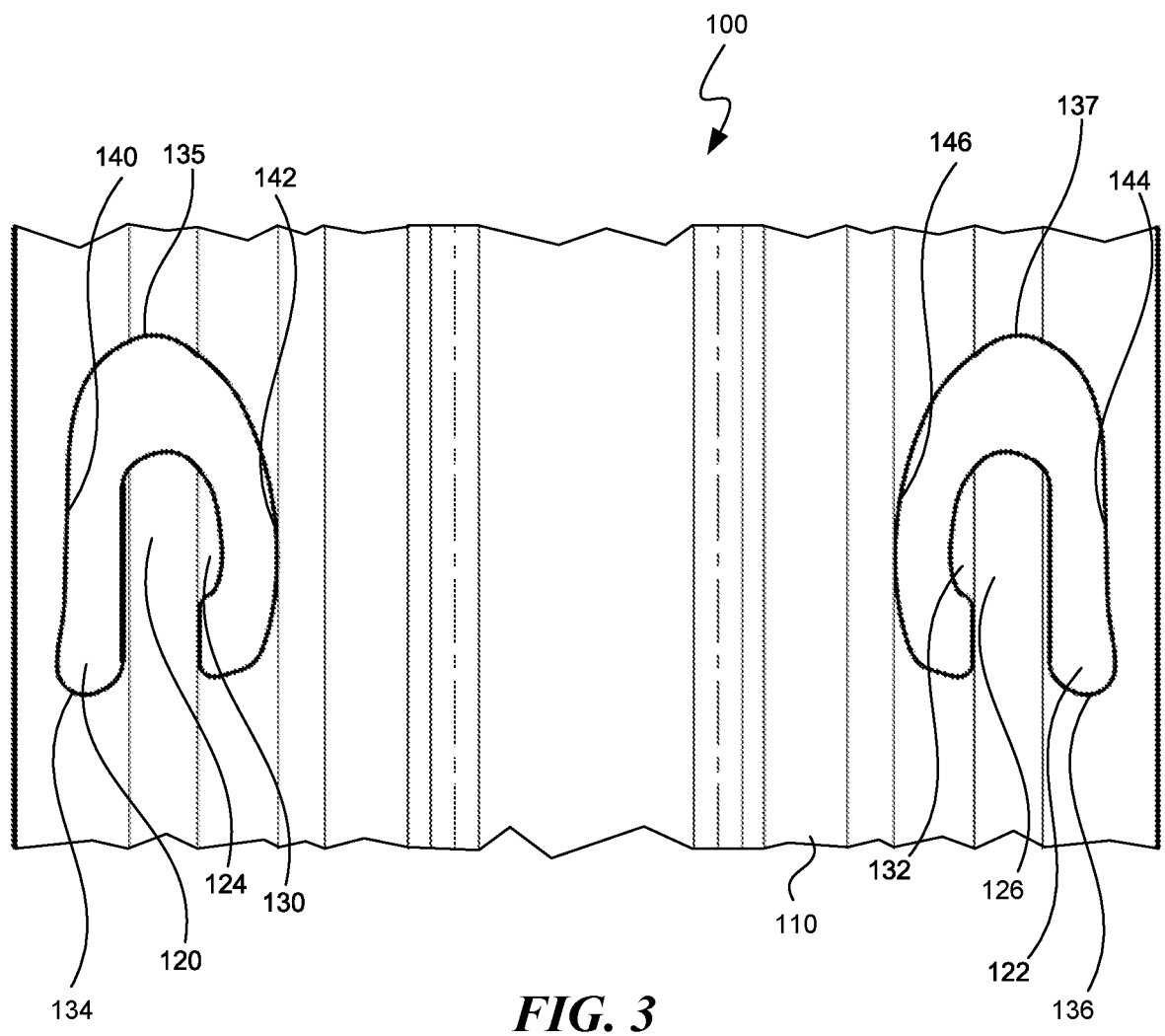
FIG. 3 is a front view of a portion of the trellis vertical line post shown in FIG. 1A, prior to forming the profile in FIG. 2.

FIGS. 1B and 1C are detailed perspective views of trellis wire notches of the post 100, with FIG. 1B being the portion of the post 100 shown in the detail circle in FIG. 1A, and FIG. 1C being the portion of the post 100 shown in the detail circle in FIG. 1B. The portion of the post 100 shown in FIG. 1B includes detail of the positioning of the first and second notches 120 and 122 with respect to the body 102. Beginning with FIG. 1B, the body 102 includes a central web 108 separating the first and second notches 120 and 122 configured to receive a trellis wire TW (see FIGS. 4B and 4D) therein, with the first and second notches 120 and 122 being mirror symmetrical about a central plane CP (see FIG. 2) of the central web 108 extending vertically in a direction along the trellis row when the post 100 is installed in the ground. As shown in the detail view of FIG. 1C, the illustrated embodiment includes a first tab 124 defining an outer side of the first notch 120 with the body 102 defining a flat edge 140 and a curved edge 142 of a second side of the first notch 120. As shown in FIG. 3, the second notch 122 can include a second tab 126 defining a first side of the second notch 122 with the body 102 defining a flat edge 144 and a curved edge 146 of a second side of the second notch 122.

The first notch can include a first retention protrusion 130 extending from the outer side of first tab 124 toward the curved edge 142 of the body 102 and configured to resist the trellis wire from escaping vertically out of the first notch 120 without first deflecting at an angle toward the center of the body 102 to travel between the first retention protrusion 130 and the curved edge 142, which will be described in greater detail below with reference to FIGS. 4A-4D. In some embodiments, the retention protrusion 130 can extend toward the curved edge 142 such that a lateral distance between the retention protrusion 130 and the flat edge 140 in a direction normal to the central plane CP is less than a diameter of the trellis wire TW. In this regard, when the wire is seated in a first wire seat surface 134 of the first notch 120, the first retention protrusion 130 can engage with or be positioned adjacent to the trellis wire TW, preventing the trellis wire TW from moving vertically and escaping from the first notch 120 at the upward force levels typically experienced by tensioning the trellis wires (e.g., by posts positioned in valleys of the ground), but still allowing the trellis wire to move vertically in a slot formed between the first retention protrusion 130 and the curved edge 142 at the elevated levels of upward force exerted by the mechanical pruning device during use. In some embodiments, the retention protrusion 130 has a curved shape that is complementary to the curved edge 142, e.g., arcuate, curvilinear, circular, etc., while in other embodiments the shape of the retention protrusion 130 can be any suitable shape, such as linear, geometric, angular, etc. In some embodiments, the retention protrusion has a thickest point 131 that is positioned laterally across the first notch 120 from the lowest point 143 of the curved edge 142. In any of these embodiments, the shape of the retention protrusion 130 and the curved edge 142 form a slot with a substantially constant width, e.g., from the top of the tab 124 to the first wire seat surface 134.

FIG. 2 is a top view of the post 100, showing the formed profile, e.g., formed by a roll forming manufacturing process, extrusion, brake pressing, or any other suitable process or combination thereof. The central web 108 spans between elbow portions 110, each bent at an angle of less than 90° relative to the central web 108, and outer flanges 112 providing structural strength to the post 100 to support the weight of the trellis system and plants, e.g., to resist bending and/or other forces. As will be described, the outer flanges 112 can at least partially define the flat edge 140 (see FIG. 1C) and a flat edge 144 of the first and second notches 120 and 122, respectively, together with the body 102.

FIG. 3 is a front view of a portion of the post 100, in a flat configuration prior to forming the profile of FIG. 2. In the illustrated embodiment, the first notch 120 includes the first tab 124, the first retention protrusion 130, the first wire seat surface 134, the flat edge 140, the curved edge 142, and a converging point 135 of uppermost portions of the flat edge 140 and the curved edge 142; and the second notch 122 includes the second tab 126, a second retention protrusion 132, a second wire seat surface 136, the flat edge 144, and the curved edge 146, and a converging point 137 of uppermost portions of the flat edge 144 and the curved edge 146. In one representative process for manufacturing the post 100, the first and second notches 120 and 122 can be cut into the body 102 as shown in FIG. 3, prior to forming the profile shown in FIG. 2; however, in other manufacturing processes of the present technology, the first and second notches 120 and 122 can be created in the body 102 after forming the profile shown in FIG. 2.

Figure 4B:
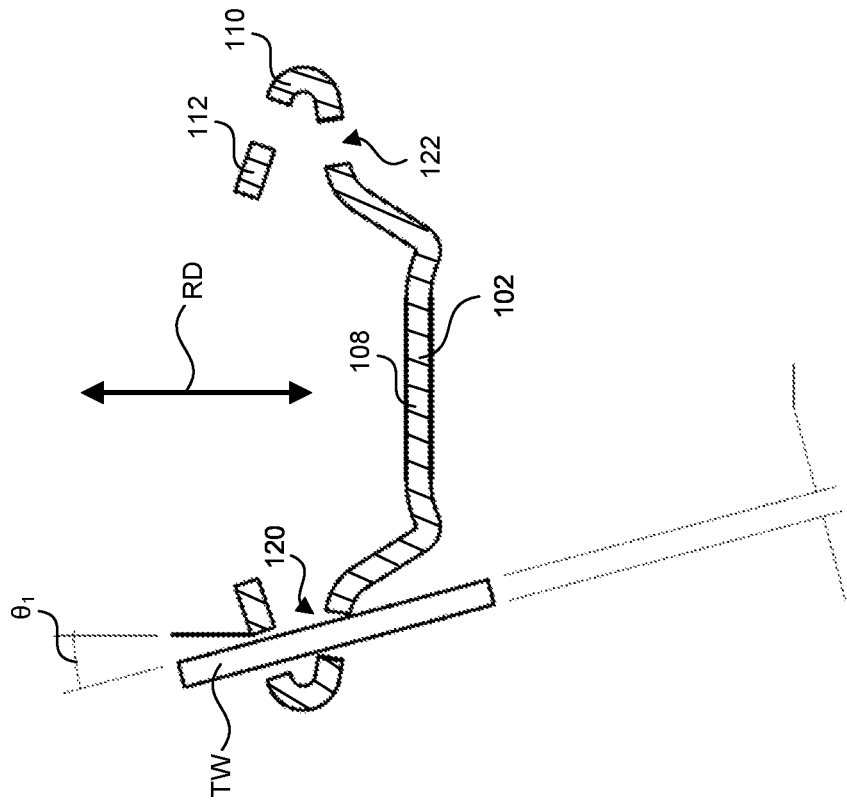
FIGS. 4A and 4B are front and top cross-sectional views, respectively, of the trellis vertical line post shown in FIG. 1A, with FIG. 4B showing a trellis wire at an intermediate position within a notch.
Figure 4A:
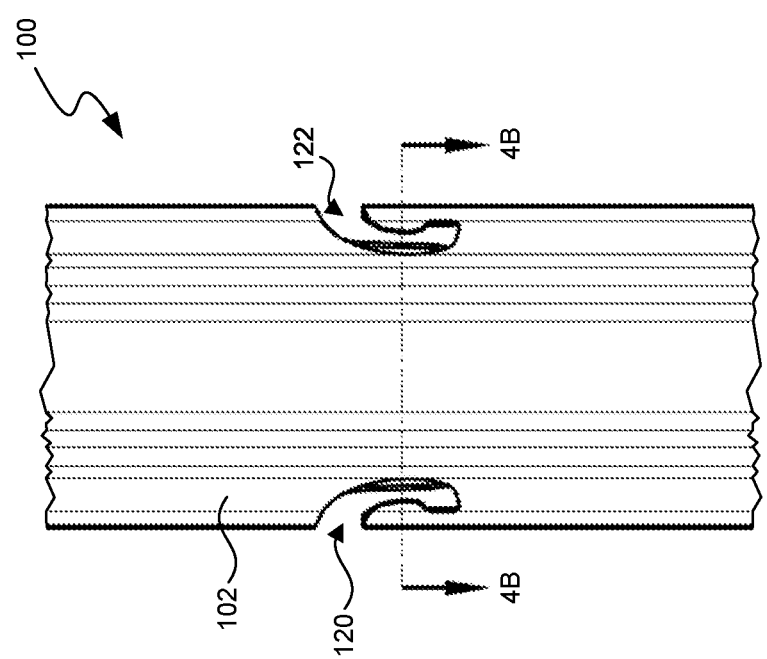
Figure 4D:
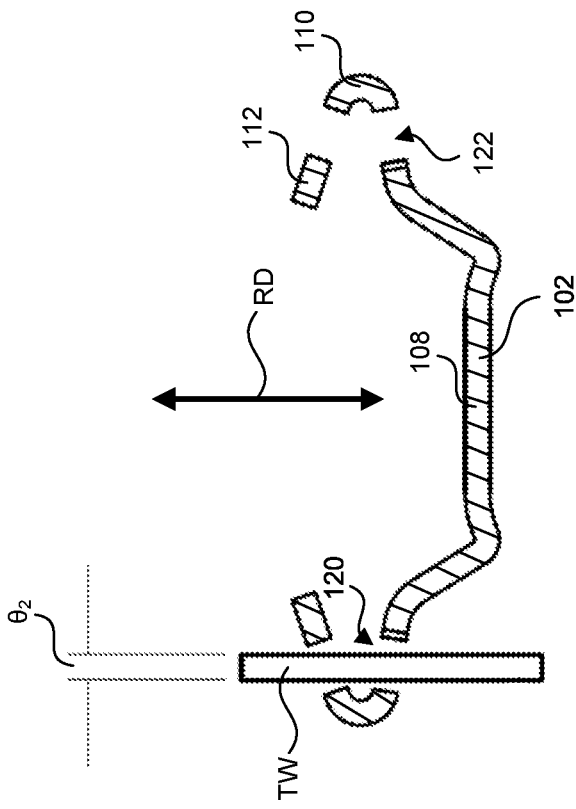
FIGS. 4C and 4D are front and top cross-sectional views, respectively, of the trellis vertical line post shown in FIG. 1A, with FIG. 4D showing the trellis wire at a seated position within the notch.
Figure 4C:
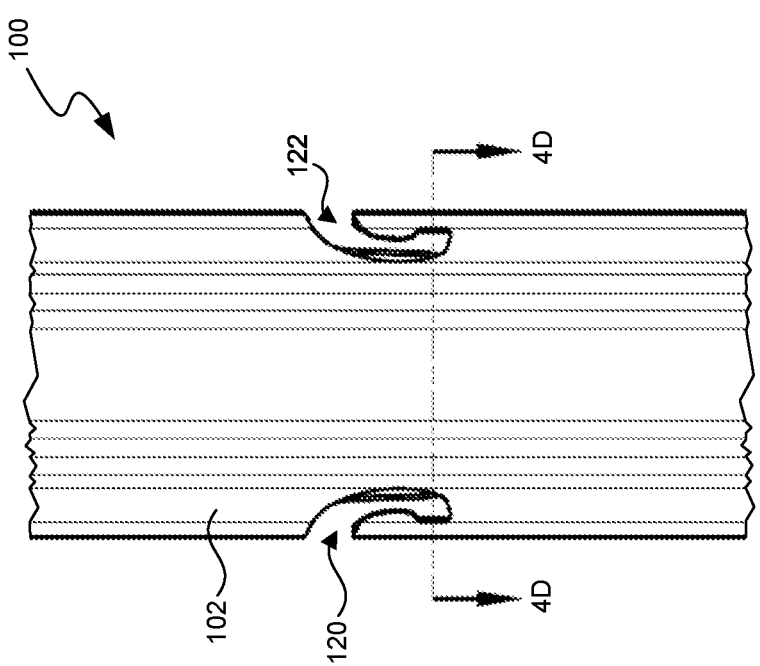

FIGS. 4A and 4B are front and top cross-sectional views, respectively, of the post 100, with FIG. 4B showing a trellis wire TW at an intermediate position within the first notch 120 adjacent the first retention protrusion 130 (see FIGS. 1C and 3), and FIGS. 4C and 4D are front and top cross-sectional views, respectively, of the post 100, with FIG. 4D showing the trellis wire TW at a seated position in contact with the first wire seat surface 134 (see FIGS. 1C and 3) within the first notch 120. As shown in FIG. 4B, after the trellis wire TW is tensioned in the installed VSP system, the trellis wire TW must bend or deflect at an angle $\theta_1$ with respect to the row direction RD of the vineyard or orchard to disengage from the first retention protrusion 130 and be inserted or removed from the first notch 120 (e.g., deflecting/bending by the angle $\theta_1$ between about 5° and 20°, about 5° and 15°, or about 7° and 13°). As shown in FIG. 4D, when the trellis wire TW is positioned in contact with the first wire seat surface 134 at the bottom of the first notch 120, the trellis wire TW can return to a straight orientation at an angle θ2 of about 0° along the row direction RD of the vineyard or orchard.

Trellis Vertical Line Post Assembly Embodiment

Figure 5A:
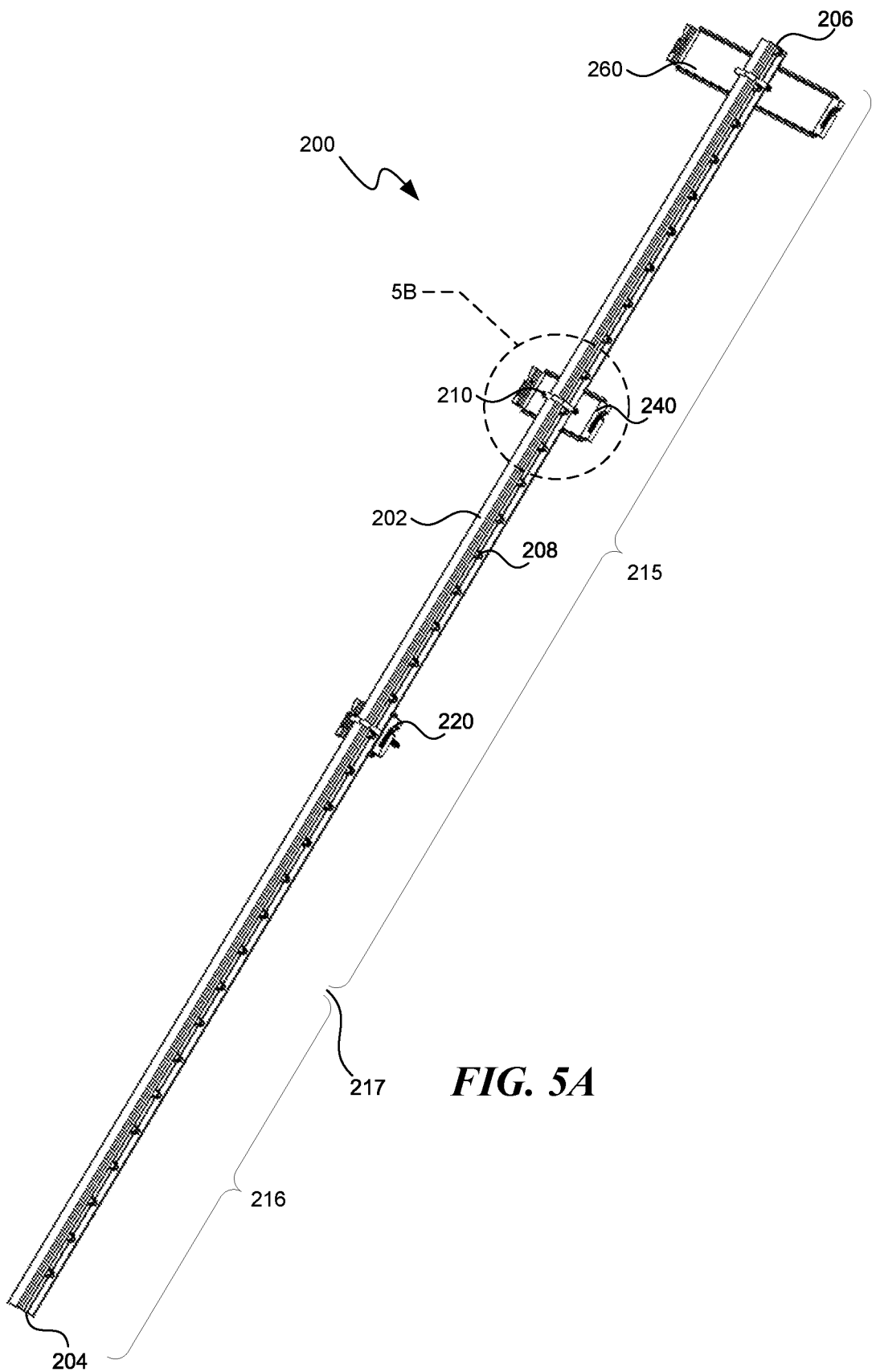
FIG. 5A is a perspective view of a representative trellis vertical line post assembly configured in accordance with embodiments of the present technology.

FIG. 5A is a perspective view of a trellis vertical line post assembly 200 ("assembly 200") configured in accordance with embodiments of the present technology. In a similar manner to the post 100 described above, the assembly 200 can be configured to be the primary load-bearing member of a vertical shoot positioning trellis system ("VSP system"); however, the assembly 200 uses a studded T-post 202 ("post 202") as a base to support the assembly 200. The studded T-post 202 can be a conventional-type studded T-post, commonly used in agricultural installations. The post 202 includes a bottom end (or end portion) 204, a top end (or end portion) 206, and a plurality of studs or protrusions 208 projecting from a side of the post 202 to prevent an attached component from slipping along the post 202, e.g., while supporting the weight of trellis lines carried by the attached component, as will be described in greater detail below. The post 202 has an above-ground upper portion 215 extending from an intermediate area 217 to the top end 206, and a subterranean portion 216 extending from the bottom end 204 to the intermediate area 217. The subterranean portion 216 is configured to be driven into the ground to support the weight of the wires of the trellis system and crops, and to provide stability in the three rotational degrees of freedom (e.g., twisting about an axis along the body 102, bending along the trellis row, and/or bending lateral to the trellis row).

The assembly 200 can further include at least one of a first cross arm 220, a second cross arm 240, and/or a third cross arm 260. As shown, each cross arm 220, 240, and 260 are arranged in ascending widths to position the trellis wires closer to the post 202 (e.g., with the first cross arm 220), or laterally further away from the post 202 and the other adjacent trellis wire (e.g., with the second and third cross arms 240 and 260). In the illustrated embodiment, the second cross arm 240 is wider than the first cross arm 220, and the third cross arm 260 is wider than the second cross arm 240. In other embodiments, any arrangement of the cross arms is suitable for use with the assembly 200, e.g., multiple instances of any of the first, second, and third cross arms 220, 240, and 260, etc. The first, second, and third cross arms 220, 240, and 260 can be coupled to the post 202 with any suitable attachment member, and in some embodiments have a u-bolt 210 fixed with fasteners (e.g., threaded nuts, not shown), while in other embodiments are coupled to the post 202 with a clamp, a bracket, wire, etc.

Figure 5B:
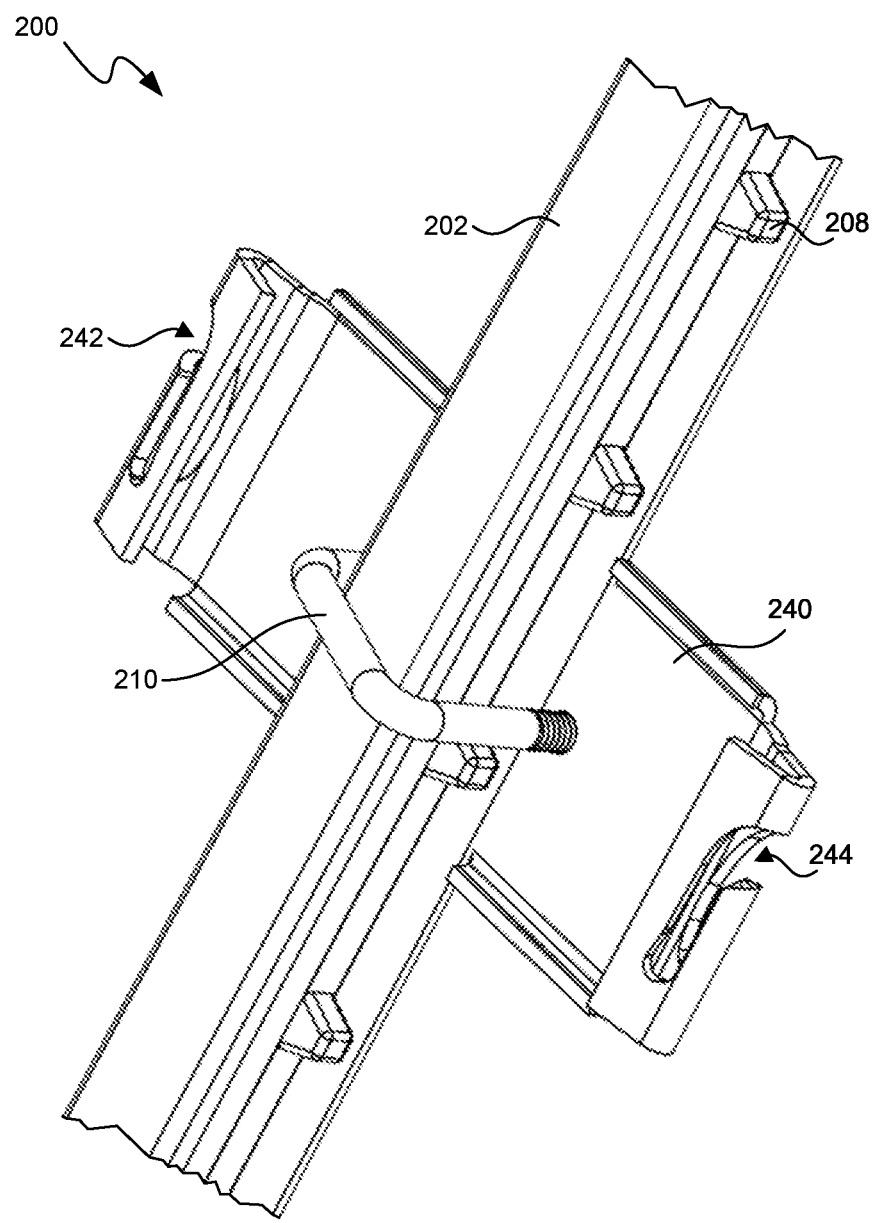
FIG. 5B is a detailed perspective view of a portion of the trellis vertical line post assembly shown in FIG. 5A.

FIG. 5B is a detailed perspective view of a portion of the assembly 200, shown in the detail circle in FIG. 5A. Although the second cross arm 240 is shown for discussion purposes in FIGS. 5B, 6A, and 6B, the first and third cross arms 220 and 260 can have similar features and profiles, with a central web 250 (see FIGS. 6A and 6B) being shorter (for the first cross arm 220) or longer (for the third cross arm 260), accordingly. Any other length of the central web is also within the scope of the present technology, with widths of cross arm generally depending on: (a) the vigor of the vines, the vine and rootstock varieties, and/or the specific climate (and therefore the volume of cane growth to be contained); and (b) the degree to which the vineyard manager and/or wine maker chooses growth compression (narrower cross arms) or more open to allow increased air flow (wider cross arms), among other various factors. As shown in FIG. 5B, the second cross arm 240 includes a notch pair having a first notch 242 and a second notch 244 positioned at lateral edges of the second cross arm 240, with the first and second notches 242 and 244 being generally open toward the top end 206. The first and second notches 242 and 244 can be mirror symmetrical about a central plane CP of the central web 250. In some embodiments, the first and second notches 242 and 244 are similar in shape, profile, and function as the first and second notches 120 and 122 of the post 100, described above. In these embodiments, the post 202 is between about 6 feet and 10 feet in length.

Figure 6A:
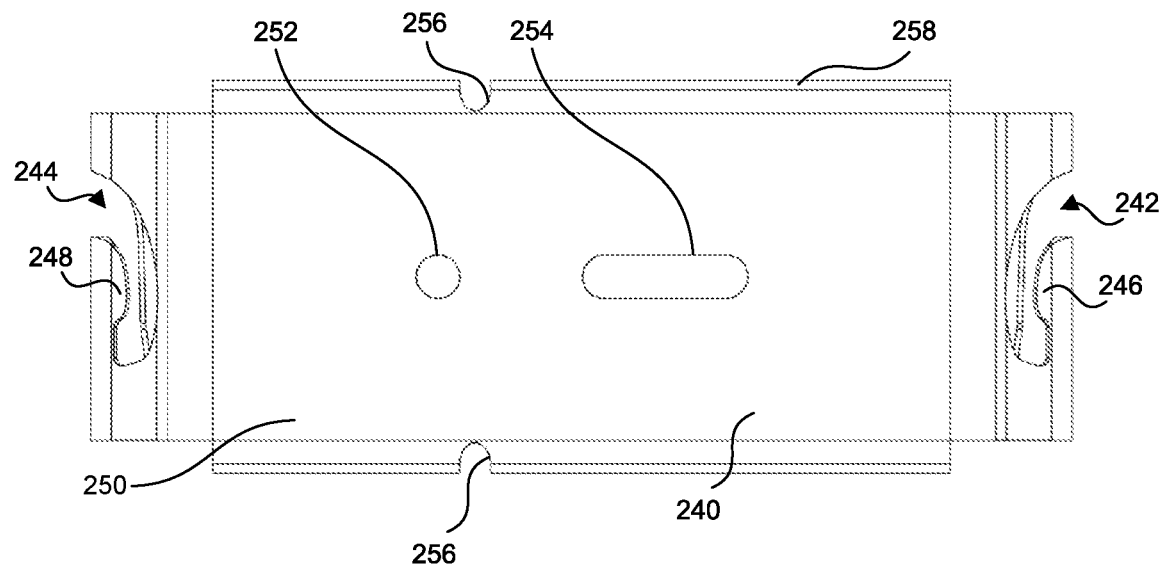
FIGS. 6A and 6B are front and top views, respectively, of a cross arm of the trellis vertical line post assembly shown in FIG. 5A.
Figure 6B:
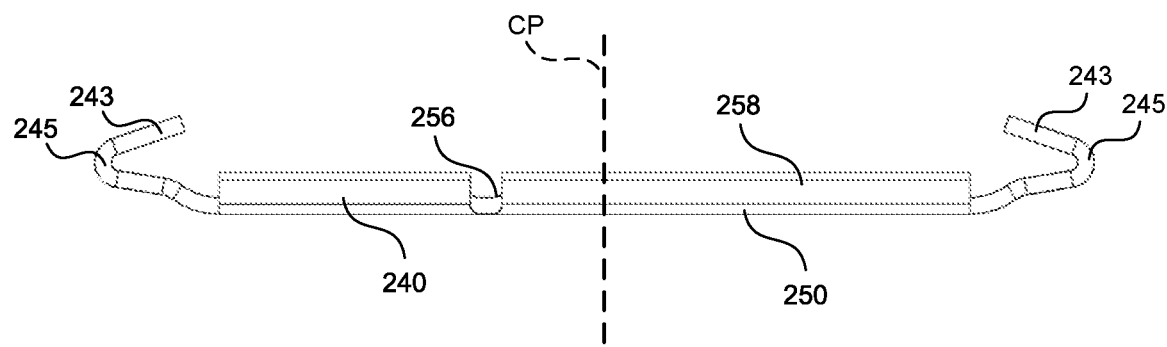

FIGS. 6A and 6B are front and top views, respectively, of the second cross arm 240 of the assembly 200. As noted above, the first and third cross arms 220 and 260 can have similar features as the second cross arm 240, except that the central web 250 of the second cross arm 240 is longer than that of the first cross arm 220 and shorter than that of the third cross arm 260. Referring first to FIG. 6A, the second cross arm 240 can include the first and second notches 242 and 244, each having first and second retention protrusions 246 and 248, respectively, configured to resist escape of a trellis wire traveling vertically out of the first and second notches 242 and 244 without first deflecting at an angle toward the center of the cross arm 240, in a similar manner to the first and second notches 120 and 122 described above with reference to FIGS. 4A-4D.

The central web 250 extends between the first and second notches 242 and 244 and can include a mounting aperture 252 and a mounting slot 254 for receiving the clamp 210 therethrough to couple the second cross arm 240 to the post 202. One or both of the upper and lower edges of the central web 250 can include stiffening ribs 258 for strengthening of the second cross arm 240. The stiffening ribs 258 can include clearance notches 256 extending through the stiffening ribs 258 to provide clearance to an edge of the post 202 such that the central web 250 can be positioned closer to the central post 202 when installed, as shown most clearly in FIG. 5B.

FIG. 6B shows the formed profile (e.g., formed by a roll forming manufacturing process, or any other suitable process). The central web 250 spans between elbow portions 245, each bent at an angle of greater than 90°, and outer flanges 243 providing structural strength to the second cross arm 240 to, e.g., support the weight of the trellis system and plants, to resist bending, etc.

Conclusion

References throughout the foregoing description to features, advantages, or similar language do not imply that all of the features and advantages that may be realized with the present technology should be or are in any single embodiment of the technology. Rather, language referring to the features and advantages is understood to mean that a specific feature, advantage, or characteristic described in connection with an embodiment is included in at least one embodiment of the present technology. Thus, discussions of the features and advantages of the present technology, and similar language, throughout this specification may, but do not necessarily, refer to the same embodiment. Furthermore, the described features, advantages, and characteristics of the present technology may be combined in any suitable manner in one or more embodiments. One skilled in the relevant art will recognize that the present technology can be practiced without one or more of the specific features or advantages of a particular embodiment. In other instances, additional features and advantages may be recognized in certain embodiments that may not be present in all embodiments of the present technology.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, for fluid (e.g., air) transfer, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. As used herein, the phrase "and/or," as in "A and/or B" refers to A alone, B alone, and both A and B.

The above Detailed Description of examples and embodiments of the present technology is not intended to be exhaustive or to limit the technology to the precise form disclosed above. While specific examples for the technology are described above for illustrative purposes, various equivalent modifications are possible within the scope of the technology, as those skilled in the relevant art will recognize. The teachings of the present technology provided herein can be applied to other systems, not necessarily the systems described above. The elements and acts of the various examples described above can be combined to provide further implementations of the technology. Some alternative implementations of the technology may include not only additional elements to those implementations noted above, but also may include fewer elements. Further, any specific numbers noted herein are only examples: other implementations may employ differing values or ranges. As used herein, the terms "about," "approximately," "near," etc., mean plus or minus 10% of the stated value unless otherwise noted.

While the above description describes various embodiments of the technology and the best mode contemplated, regardless how detailed the above text, the technology can be practiced in many ways. Details of the system may vary considerably in its specific implementation, while still being encompassed by the present disclosure. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims. From the foregoing, it will be appreciated that specific embodiments of the technology have been described herein for purposes of illustration, but that various modifications may be made without deviating from the spirit and scope of the various embodiments of the technology. The following examples provide representative embodiments of the present technology.

We claim:

1. An agricultural vertical line post for carrying a portion of trellis wire, the agricultural vertical line post comprising:
   an elongate body having:
      a top end, a bottom end, and a central plane extending longitudinally along and bisecting the elongate body;
      an above-ground portion extending from an intermediate area of the elongate body to the top end and a subterranean portion extending from the intermediate area to the bottom end;
      an elbow portion on a lateral side of the elongate body with respect to the central plane, the elbow portion having a bend at an outermost lateral position of the elongate body from the central plane; and
      a notch configured to receive a trellis wire therein and positioned within the elbow portion, the notch open toward the top end and having:
         a trellis wire seat surface positioned at a bottom of the notch;
         a tab extending upward from the bottom of the notch and having at least one edge portion defining an outer side of the notch;
         a first edge and a second edge each formed on the elongate body and defining an inner side of the notch, wherein the first edge is positioned laterally outwardly from at least a portion of the second edge with respect to the central plane, and wherein an uppermost portion of the first edge converges with an uppermost portion of the second edge at a laterally outermost portion of the bend at an opposite end of the notch from the trellis wire seat surface; and
         a retention protrusion extending laterally from the at least one edge portion of the tab into the notch, wherein the retention protrusion extends toward the second edge to a position such that a lateral distance between the retention protrusion and the first edge in a direction normal to the central plane is less than a diameter of the trellis wire, and wherein, in use, the retention protrusion is configured to retain the trellis wire within the notch by resisting upward forces on the trellis wire until a threshold upward force is applied to the trellis wire to release the trellis wire from the notch.

2. The agricultural vertical line post of claim 1, wherein the elbow portion is a first elbow portion, the bend is a first bend, the notch is a first notch, the trellis wire is a first trellis wire, the tab is a first tab, and the retention protrusion is a first retention protrusion, and wherein the agricultural vertical line post further comprises:
   a second elbow portion on a lateral side of the elongate body opposite the first elbow portion with respect to the central plane, the second elbow portion having a second bend at an outermost lateral position of the elongate body from the central plane; and
   a second notch configured to receive a second trellis wire therein and positioned within the second elbow portion, the second notch open toward the top end and having:
      a trellis wire seat surface positioned at a bottom of the second notch;
      a second tab extending upward from the bottom of the second notch and having at least one edge portion defining an outer side of the second notch;
      a third edge and a fourth edge formed on the elongate body and defining an inner side of the second notch, wherein the third edge is positioned laterally outwardly from at least a portion of the fourth edge with respect to the central plane, and wherein an uppermost portion of the third edge converges with an uppermost portion of the fourth edge at a laterally outermost portion of the second bend at an opposite end of the second notch from the trellis wire seat surface; and
      a second retention protrusion extending laterally from the at least one edge portion of the second tab into the second notch, wherein the second retention protrusion extends toward the fourth edge to a position such that a lateral distance between the second retention protrusion and the third edge in a direction normal to the central plane is less than a diameter of the trellis wire, and wherein, in use, the second retention protrusion is configured to retain the second trellis wire within the second notch by resisting upward forces on the second trellis wire until a threshold upward force is applied to the second trellis wire to release the second trellis wire from the second notch.

3. The agricultural vertical line post of claim 1, wherein the first edge is a flat edge.

4. The agricultural vertical line post of claim 1, wherein the second edge is a curved edge, and wherein the first retention protrusion has a complementary curve with respect to the curved edge.

5. The agricultural vertical line post of claim 2, wherein the first edge is a first flat edge, and wherein the third edge is a second flat edge.

6. The agricultural vertical line post of claim 2, wherein:
the second edge is a first curved edge,
the fourth edge is a second curved edge,
the first retention protrusion has a complementary curve with respect to the first curved edge, and
the second retention protrusion has a complementary curve with respect to the second curved edge.

7. The agricultural vertical line post of claim 2, wherein the first notch and the second notch define a notch pair, and wherein the agricultural vertical line post has a plurality of notch pairs spaced vertically apart along the above-ground portion.

8. The agricultural vertical line post of claim 2, wherein the elongate body further comprises a central web positioned between the first and second notches.

9. The agricultural vertical line post of claim 1, wherein the subterranean portion is configured to be driven into the ground for stability in the three rotational degrees of freedom.

10. The agricultural vertical line post of claim 2, wherein the first and second notches are mirror symmetrical about the central plane.

11. The agricultural vertical line post of claim 1, wherein the bend of the elbow portion is bent at an angle of less than 90°.

12. The agricultural vertical line post of claim 1, wherein the retention protrusion is positioned with respect to the first edge such that the position of the trellis wire while in contact with a thickest point of the retention protrusion and the flat edge is at an angle from about 5° to 20° relative to the central plane.

13. The agricultural vertical line post of claim 1, wherein the retention protrusion is positioned with respect to the first edge such that the position of the trellis wire while in contact with a thickest point of the retention protrusion and the flat edge is at an angle from about 7° to 13° relative to the central plane.

14. The agricultural vertical line post of claim 1, wherein the elongate body is formed by roll forming, brake pressing, or stamping.

15. The agricultural vertical line post of claim 1, wherein the notch is formed by machining, punching, or cutting.

16. A cross arm for an agricultural vertical line post assembly for carrying a portion of trellis wire, the cross arm comprising:
a body having a central web and a central plate extending vertically along and bisecting the central web, the body further including an elbow portion on a lateral side of the body with respect to the central plane, the elbow portion having a bend at an outermost lateral position of the body from the central plane; and
a notch configured to receive a trellis wire therein and positioned within the elbow portion, the notch open upward and having:
a trellis wire seat surface positioned at a bottom of the notch;
a tab extending upward from the bottom of the notch and having at least one edge portion defining an outer side of the notch;
a first edge and a second edge each formed on the elongate body and defining an inner side of the notch, wherein the first edge is positioned laterally outwardly from at least a portion of the second edge with respect to the central plane, and wherein an uppermost portion of the first edge converges with an uppermost portion of the second edge at a laterally outermost portion of the bend at an opposite end of the notch from the trellis wire seat surface; and
a retention protrusion extending laterally from the at least one edge portion of the tab into the notch, wherein the retention protrusion extends toward the second edge to a position such that a lateral distance between the retention protrusion and the first edge in a direction normal to the central plane is less than a diameter of the trellis wire, and wherein, in use, the retention protrusion is configured to retain the trellis wire within the notch by resisting upward forces on the trellis wire until a threshold upward force is applied to the trellis wire to release the trellis wire from the notch.

17. The cross arm of claim 16, wherein the elbow portion is a first elbow portion, the bend is a first bend, the notch is a first notch, the trellis wire is a first trellis wire, the tab is a first tab, and the retention protrusion is a first retention protrusion, and wherein the cross arm further comprises:
a second elbow portion on a lateral side of the body opposite the first elbow portion with respect to the central plane, the second elbow portion having a second bend at an outermost lateral position of the body from the central plane; and
a second notch configured to receive a second trellis wire therein and positioned within the second elbow portion, the second notch and open upward and having:
a trellis wire seat surface positioned at a bottom of the second notch;
a second tab extending upward from the bottom of the second notch and having at least one edge portion defining an outer side of the second notch;
a third edge and a fourth edge formed on the elongate body and defining an inner side of the second notch, wherein the third edge is positioned laterally outwardly from at least a portion of the fourth edge with respect to the central plane, and wherein an uppermost portion of the third edge converges with an uppermost portion of the fourth edge at a laterally outermost portion of the second bend at an opposite end of the second notch from the trellis wire seat surface; and
a second retention protrusion extending laterally from the at least one edge portion of the second tab into the second notch, wherein the second retention protrusion extends toward the fourth edge to a position such that a lateral distance between the second retention protrusion and the third edge in a direction normal to the central plane is less than a diameter of the trellis wire, and wherein, in use, the second retention protrusion is configured to retain the second trellis wire within the second notch by resisting upward forces on the second trellis wire until a threshold upward force is applied to the second trellis wire to release the second trellis wire from the second notch.

18. The cross arm of claim 16, wherein the first edge is a flat edge.

19. The cross arm of claim 16, wherein the second edge is a curved edge, and wherein the first retention protrusion has a complementary curve with respect to the curved edge.

20. The cross arm of claim 17, wherein the first edge is a first flat edge, and wherein the third edge is a second flat edge.

21. The cross arm of claim 17, wherein:
the second edge is a first curved edge,
the fourth edge is a second curved edge,
the first retention protrusion has a complementary curve with respect to the first curved edge, and
the second retention protrusion has a complementary curve with respect to the second curved edge.

22. The cross arm of claim 16, wherein the central web has an aperture configured to receive a clamp to operably couple the cross arm to a vertical line post.

23. The cross arm of claim 22, wherein the vertical line post has a subterranean portion configured to be driven into the ground for stability in the three rotational degrees of freedom.

24. The cross arm of claim 16, wherein the central web has a stiffening rib positioned at an edge of the central web, and wherein the stiffening rib has a clearance notch extending through the stiffening rib.

25. The cross arm of claim 17, wherein the first and second notches are mirror symmetrical about the central plane.

26. The cross arm of claim 16, wherein the bend of the elbow portion is bent at an angle of less than 90°.

27. The cross arm of claim 16, wherein the retention protrusion is positioned with respect to the first edge such that the position of the trellis wire while in contact with a thickest point of the retention protrusion and the flat edge is at an angle from about 5° to 20° relative to the central plane.

28. The cross arm of claim 16, wherein the retention protrusion is positioned with respect to the first edge such that the position of the trellis wire while in contact with a thickest point of the retention protrusion and the flat edge is at an angle from about 7° to 13° relative to the central plane.

29. The cross arm of claim 16, wherein the body is formed by roll forming, brake pressing, or stamping.

30. The cross arm of claim 16, the notch is formed by machining, punching, or cutting.

\* \* \* \* \*